July 3, 1956
A. W. MELGAARD
2,752,961
JIG ADJUSTING MEANS FOR A HAND TOOL TYPE ROUTER
Filed Aug. 12, 1955
2 Sheets-Sheet 1
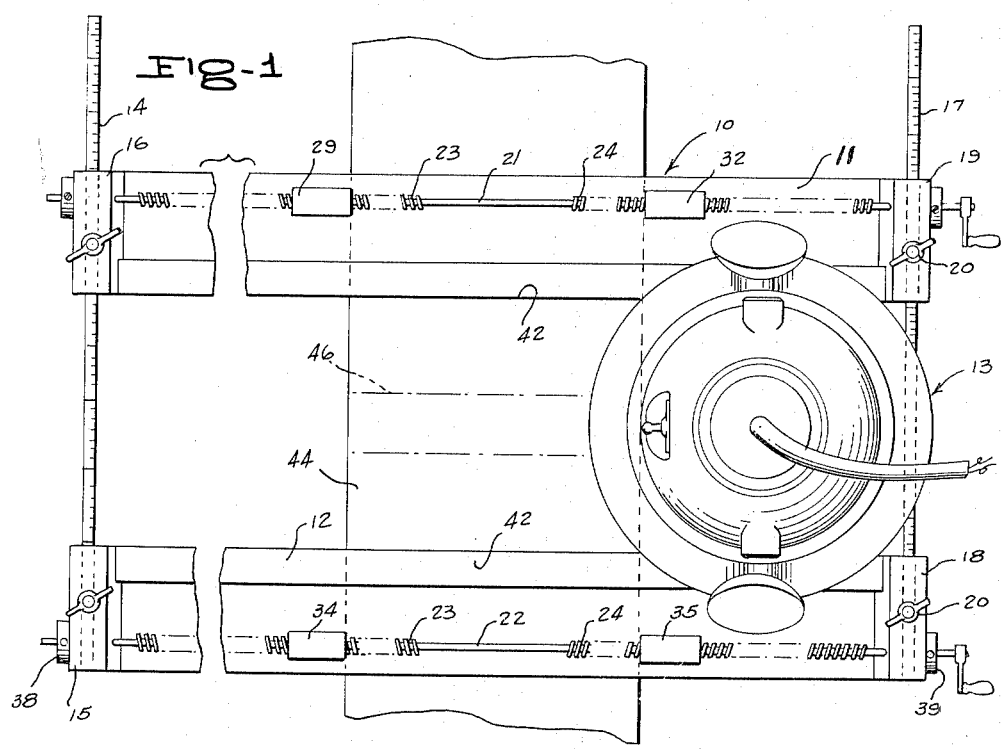
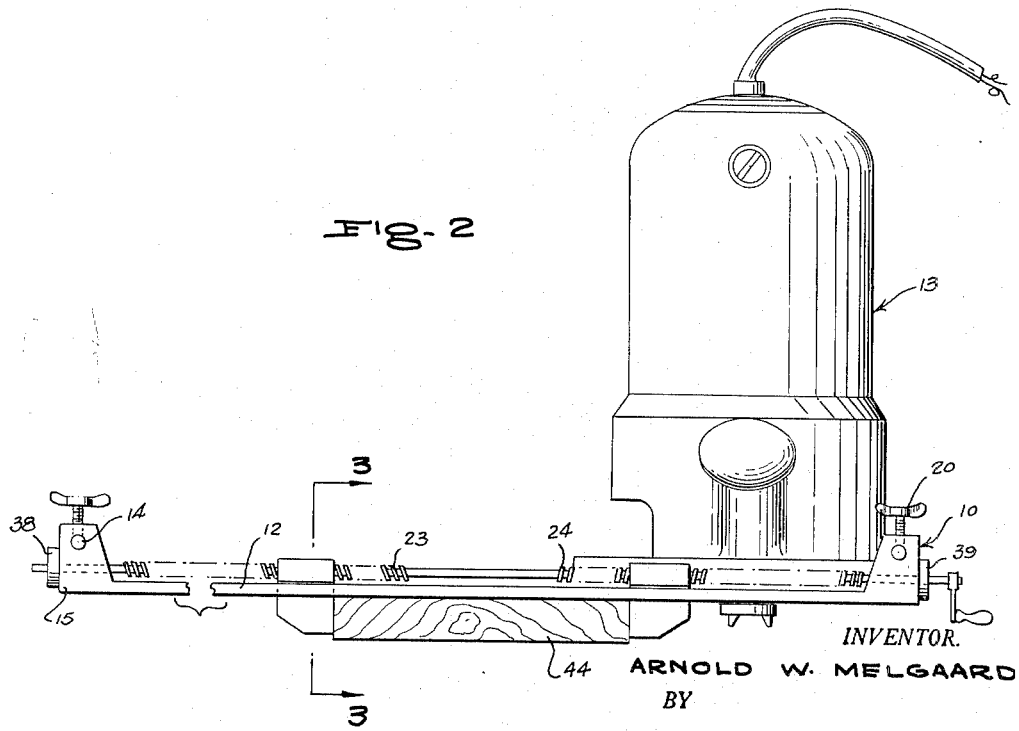
INVENTOR.
ARNOLD W. MELGAARD
BY
McMorrow, Berman & Davidson
ATTORNEYS

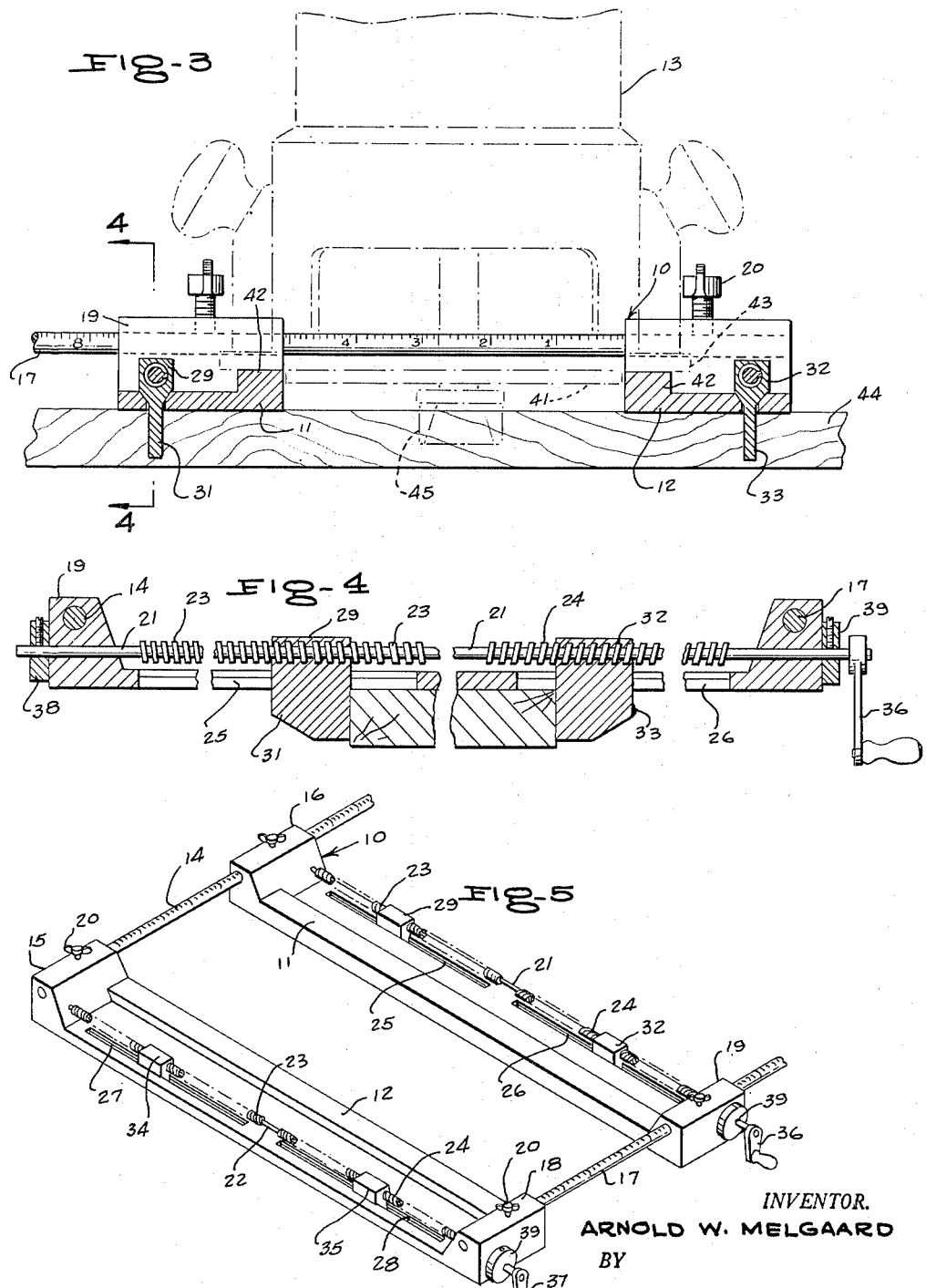

United States Patent Office 2,752,961
Patented July 3, 1956

2,752,961

JIG ADJUSTING MEANS FOR A HAND TOOL TYPE ROUTER

Arnold W. Melgaard, North Platte, Nebr.

Application August 12, 1955, Serial No. 527,960

3 Claims. (Cl. 144—136)

The present invention relates to woodworking tools and specifically to a jig for supporting and guiding a router on a board.

An object of the present invention is to provide a portable and lightweight jig for supporting and guiding a router on a board while cutting grooves in the board.

Another object of the present invention is to provide a jig for a router which is adjustable for use with all makes of routers.

A further object of the present invention is to provide a jig for a router having a built-in rule so that the router may be accurately positioned on a board to be routed.

A still further object of the present invention is to provide a router jig of sturdy construction and few parts, one easily assembled for use and disassembled for storage and transport with other tools, and one which is economical to manufacture and assemble.

These and other objects and advantages of the present invention will be fully aparent from the following description when taken in connection with the annexed drawings, in which:

Figure 1 is a top plan view of the router jig of the present invention with a router supported thereon and the jig overlying a board to be grooved by the router, Figure 2 is a side elevational view of the assembly of Figure 1, Figure 3 is a sectional view, on an enlarged scale, taken on the line 3—3 of Figure 2, Figure 4 is a sectional view, on the scale of Figure 3, taken on the line 4—4 of Figure 3, and Figure 5 is an isometric view of the router jig of the present invention, on a reduced scale.

Referring in greater detail to the drawings in which like numerals indicate like parts throughout the several views, the router jig of the present invention is indicated by the reference numeral 10 and comprises a pair of rails 11 and 12 disposed horizontally and arranged in parallel spaced relation and adapted to support a router for back and forth movement thereon. A router indicated by the reference numeral 13 is shown in full lines in Figures 1 and 2 and in dotted lines in Figure 3. A graduated bar 14 extends transversely and slidably through the complemental ends 15 and 16 of the rails 11 and 12, respectively, and another graduated bar 17 extends transversely and slidably through the other complemental ends 18 and 19 of the rails 11 and 12, respectively.

Means is provided for securing the bars 14 and 17 to the rails 11 and 12 in any position of their sliding movement. Specifically, such means embodies a vertically-disposed thumbscrew 20 extending through threaded bores on each of the ends 16 and 19 of the rail 11 and through each of the ends 15 and 18 of the rail 12 and clampingly engageable with the respective bars 14 and 17 to hold them in their adjusted positions.

A shaft 21 is positioned longitudinally of and spaced above the rail 11 and another shaft 22 is positioned longitudinally of and spaced above the rail 12, the shafts 21 and 22 being rotatably supported upon the rails 11 and 12, respectively, with each having one end exteriorly of the adjacent ends 19 and 18, respectively, of the rails 11 and 12. The portion of each of the shafts 21 and 22 intermediate its supports has a right-handed threaded part and a left-handed threaded part, the right-handed threaded part being indicated by the reference numeral 23 and left-handed threaded part being indicated by the reference numeral 24. The right-handed threaded part 23 of the shaft 21 is in alignment with the right-handed threaded part 23 of the shaft 22 and the left-handed threaded part 24 of the shaft 21 is in alignment with the left-handed threaded part of the shaft 22.

The rail 11 is provided with a slot 25 extending longitudinally of and beneath the threaded part 23 of the shaft 21 and with another slot 26 longitudinally of and beneath the threaded part 24 of the shaft 21, the slots 25 and 26 being vertically disposed. The rail 12 is provided with similar slots 27 and 28 disposed beneath the threaded portions 23 and 24, respectively, of the shaft 22. A clamping member 29 has a lower portion 31 extending through the slot 25 and has its upper portion threadedly engaged with the threaded part 23 of the shaft 21. Another clamping member 32 has its lower portion 33 extending through the slot 26 in the rail 11 and its upper portion threadedly engaged with the threaded part 24 of the shaft 21, the clamping members 29 and 32 being movable toward and away from each other in response to the rotation of the shaft 21 in clockwise and counterclockwise directions. Other clamping members 34 and 35 are similarly disposed in the slots 27 and 28, respectively, and are connected to the threaded parts of the shaft 22 for movement toward and away from each other in response to similar movement of the shaft 22.

Cranks 36 and 37 on the adjacent ends of the shafts 21 and 22, respectively, constitute a manually-operable means for effecting the rotation of the shafts 21 and 22 in clockwise and counterclockwise directions. A pair of collars 38 and 39 are secured to the opposite ends of each of the shafts 21 and 22 exteriorly of the rails 11 and 12 and provide a means for positioning the respective shafts 21 and 22 with respect to the rails 11 and 12.

In use, the router 13 is provided with a sub-base plate shown in dotted lines and indicated by the reference numeral 41 in Figure 3 and is mounted upon the rails 11 and 12 with the sub-base plate 41 positioned between the rails 11 and 12 adjacent the upstanding ridges 42 rising therefrom and with the base plate of the router 13 resting upon the ridges 42, the base plate being shown in dotted lines in Figure 3 and indicated by the reference numeral 43. The rails 11 and 12 are mounted upon a board 44 to be routed and the shafts 21 and 22 are rotated to bring the clamping members 29 and 32 together and the clamping members 34 and 35 together to their positions where they embrace and grip the sides of the board 44. The router 13 is then pushed along the trackways formed by the ridges 42 of the rails 11 and 12, the cutting tool of the router projecting below the router and indicated by the reference numeral 45 cutting a groove in the boards 44, the groove being shown in the dotted lines in Figure 1 and indicated by the reference numeral 46.

The thumbscrews 20 provide an easy means for adjusting the rails 11 and 12 toward and away from each other to accommodate routers of different widths and also provide a quick means for disassembly of the router jig of the present invention when it is desired to store it or transport it with other tools. The graduated scales upon the bars 14 and 17 provide a means for accurately and quickly positioning the rails 11 and 12 with reference to a groove to be cut in a board and for accurately positioning the rails 11 and 12 upon the board.

What is claimed is:

1. A jig for a router comprising a pair of horizontally-disposed rails arranged in parallel spaced relation and adapted to support a router for sliding movement thereon, a pair of graduated bars, each extending transversely and slidably through the complemental ends of said rails, means for securing the complemental ends of said rails to each of said bars in any of their positions of adjustment, a shaft provided with right and left-hand threaded parts positioned longitudinally of and spaced above each of said rails and mounted in said rails for clockwise and counterclockwise movement and having one end exteriorly of one end of said rail, a pair of internally threaded clamping members positioned on the threaded parts of each of said shafts for movement toward each other in response to clockwise movement of said shaft and for movement away from each other in response to counterclockwise movement of said shaft, and means on said one end of each shaft for effecting the clockwise and counterclockwise movements of the latter.

2. A jig for a router comprising a pair of horizontally-disposed rails arranged in parallel spaced relation and adapted to support a router for sliding movement thereon, a pair of graduated bars, each extending transversely and slidably through the complemental ends of said rails, means for securing the complemental ends of said rails to each of said bars in any of their positions of adjustment, a shaft provided with right and left-hand threaded parts positioned longitudinally of and spaced above each of said rails and mounted in said rails for clockwise and counterclockwise movement and having one end exteriorly of one end of said rail, an internally threaded clamping member connected to each of said threaded parts on each shaft for movement therewith, the pair of clamping members being movable toward each other in response to clockwise movement of said shaft and movable away from each other in response to counterclockwise movement of said shaft, and means on said one end of each shaft for effecting the clockwise and counterclockwise movements of the latter.

3. A jig for a router comprising a pair of horizontally-disposed rails arranged in parallel spaced relation and adapted to support a router for sliding movement thereon, a pair of graduated bars each extending transversely and slidably through the complemental ends of said rails, means for securing the complemental ends of said rails to each of said bars in any of their positions of adjustment, a shaft provided with right and left-hand threaded parts positioned longitudinally of and spaced above each of said rails and mounted in said rails for clockwise and counterclockwise movement and having one end exteriorly of one end of said rail, each of said rails being provided with a vertically-disposed slot extending longitudinally thereof beneath each of the threaded portions of the shaft of said rail, an internally threaded clamping member disposed in each of said slots with a lower portion thereof projecting below the adjacent rail and with its upper portion threadedly engaged with the adjacent threaded part of the associated shaft, the clamping members of each shaft being movable toward each other in response to clockwise movement of said shaft and movable away from each other in response to counterclockwise movement of said shaft, and means on said one end of each shaft for effecting the clockwise and counterclockwise movements of the latter.

References Cited in the file of this patent

UNITED STATES PATENTS

| | | |
|---|---|---|
| 1,800,338 | Chapman | Apr. 14, 1931 |
| 2,591,002 | Pedron | Apr. 1, 1952 |
| 2,676,624 | Gecmen | Apr. 27, 1954 |
| 2,688,347 | Schmidt | Sept. 7, 1954 |
| 2,702,569 | Yelle | Feb. 22, 1955 |

FOREIGN PATENTS

| | | |
|---|---|---|
| 1,020,097 | France | Nov. 12, 1952 |
| 725,025 | Great Britain | Mar. 2, 1955 |